United States Patent [19]

Kobayashi et al.

[11] Patent Number: 4,887,485

[45] Date of Patent: Dec. 19, 1989

[54] TORQUE VARIATION ABSORBING DEVICE

[75] Inventors: Kiyonori Kobayashi, Chiryu; Masakazu Kamiya, Toyoake; Junji Kagiyama; Motoi Hyodo, both of Toyota, all of Japan

[73] Assignee: Aisin Seiki Kabushiki Kaisha, Kariya, Japan

[21] Appl. No.: 117,404

[22] Filed: Nov. 2, 1987

Related U.S. Application Data

[63] Continuation of Ser. No. 895,821, Aug. 12, 1986, abandoned.

[30] Foreign Application Priority Data

Sep. 20, 1985 [JP] Japan ................. 60-144676

[51] Int. Cl.$^4$ .................... F16F 15/10; F16D 3/14
[52] U.S. Cl. .................... 74/574; 192/106.2; 188/218 A; 464/66; 464/68
[58] Field of Search .................. 74/572, 574; 464/66, 464/7, 45, 67, 68, 107, 63, 24, 41, 46; 192/106.1, 106.2, 107 R, 107 M, 107 L; 188/218 A, 218 XL, 73.2, 378, 381

[56] References Cited

U.S. PATENT DOCUMENTS

| | | |
|---|---|---|
| 1,325,057 | 12/1919 | Tibbetts . |
| 1,567,915 | 12/1925 | Cole ................. 188/73.2 X |
| 1,635,855 | 7/1927 | Moorhouse . |
| 2,033,835 | 3/1936 | Lansing ................. 192/107 X |
| 2,158,244 | 5/1939 | Mistretta et al. ............. 464/66 X |
| 2,291,405 | 7/1942 | Nutt ................. 192/106.2 |
| 2,364,988 | 12/1944 | McFarland . |
| 2,519,865 | 8/1950 | Wellman ................. 192/107 R |
| 2,850,118 | 9/1958 | Byers ................. 192/107 R X |
| 2,859,637 | 11/1958 | Hagenlocher . |
| 3,033,326 | 5/1962 | Byers ................. 188/73.1 X |
| 3,107,551 | 10/1963 | Cline . |
| 3,507,375 | 4/1970 | Ryland ................. 192/107 R |
| 3,552,533 | 1/1971 | Nitz ................. 192/107 M |
| 3,605,968 | 9/1971 | Ely ................. 188/73.2 X |
| 3,983,982 | 10/1976 | Worner . |
| 4,002,043 | 1/1977 | Yoshida . |
| 4,018,320 | 4/1977 | Schrape et al. . |
| 4,101,015 | 7/1975 | Radke . |
| 4,171,147 | 10/1979 | Swisher, Jr. et al. . |
| 4,186,826 | 2/1980 | MacKendrick et al. ....... 192/107 C |
| 4,220,233 | 9/1980 | Ban et al. ................. 74/572 X |
| 4,289,220 | 9/1981 | Onuma et al. ............. 192/106.2 X |
| 4,431,100 | 2/1984 | Kajikawa et al. .......... 192/106.2 |
| 4,433,771 | 2/1984 | Caray ................. 192/106.2 |
| 4,538,718 | 9/1985 | Maucher ................. 192/106.2 |
| 4,596,535 | 6/1986 | Ooga ................. 464/68 |
| 4,634,398 | 1/1987 | Alas ................. 464/68 |
| 4,640,402 | 3/1987 | Hartig et al. ............. 192/106.2 |
| 4,663,983 | 5/1987 | Kobayashi et al. ........... 464/88 X |

FOREIGN PATENT DOCUMENTS 675483 12/1963 Canada .
1801065 11/1959 Fed. Rep. of Germany .

(List continued on next page.)

Primary Examiner—Rodney M. Lindsey
Attorney, Agent, or Firm—Burns, Doane, Swecker & Mathis

[57] ABSTRACT

The torque variation absorbing device comprises a first flywheel, a second flywheel, a spring mechanism, a damping and torque limiting mechanism and a hysteresis mechanism. The hysteresis mechanism comprises a friction plate and a cone spring interposed between the first and second flywheels. The friction plate comprises a friction lining and a ring plate fastened to the friction lining. The ring plate has a connecting element to be connected with the first or second flywheel. A space is formed between the friction lining and the connecting element, and therefore, when the friction lining material is fastened, such as by hot-pressing or adhesive, to the ring plate, the space prevents friction lining material from flowing out before hardening and adhesive agent from spreading. In this arrangement of the device, when the friction force of the friction plate has worn the hysteresis mechanism is able to obtain a stable hysteresis.

7 Claims, 3 Drawing Sheets

FOREIGN PATENT DOCUMENTS

| | | |
|---|---|---|
| 1680669 | 7/1970 | Fed. Rep. of Germany . |
| 2926012 | 2/1980 | Fed. Rep. of Germany . |
| 3529816 | 3/1986 | Fed. Rep. of Germany ........ 464/66 |
| 644831 | 10/1928 | France . |
| 45-27488 | 9/1970 | Japan ................................ 192/106.2 |
| 59-166723 | 9/1984 | Japan . |
| 329414 | 6/1958 | Switzerland . |
| 320066 | 10/1929 | United Kingdom . |
| 423948 | 2/1935 | United Kingdom . |
| 1030851 | 5/1966 | United Kingdom . |
| 1230284 | 4/1971 | United Kingdom . |
| 1257458 | 12/1971 | United Kingdom . |
| 1413429 | 11/1975 | United Kingdom ............. 192/106.2 |
| 1426885 | 3/1976 | United Kingdom . |
| 1462014 | 1/1977 | United Kingdom . |
| 1474566 | 5/1977 | United Kingdom . |
| 2000257 | 1/1979 | United Kingdom . |
| 2060819 | 5/1981 | United Kingdom .................. 464/68 |

TORQUE VARIATION ABSORBING DEVICE

This application is a continuation of application Ser. No. 895,821 filed Aug. 12, 1986, now abandoned.

BACKGROUND OF THE INVENTION

1. Field of the Invention

The present invention relates to a torque variation absorbing device for an engine.

2. Description of the Prior Art

An engine for an automobile or an aircraft is provided with a torque variation absorbing device for transmission of the power of the engine.

A known type of torque variation absorbing device is disclosed in laid-open Japanese patent application 59-166723. The known device has two inertia members, i.e., a first flywheel member which is rotatably connected to a crankshaft of an engine and a second flywheel member which is connected to a follower means, e.g., a transmission member driven by a clutch member, and is rotatable with respect to the first flywheel member. Between the first and the second flywheel members, a spring mechanism, a damping and torque limiting mechanism and a hysteresis mechanism are provided.

In this device, the rotation of the crankshaft is transmitted to the second flywheel member through the first flywheel member, the spring mechanism, the damping and torque limiting mechanism and the hysteresis mechanism. Thus, the torque variation is absorbed by the vibration system defined by these members. The hysteresis mechanism comprises a first driving plate, a friction plate and a second drive plate. A hysteresis effect is provided by friction of the friction plate with respect to other members.

However, in the above described device, the hysteresis effect can create an unstable condition as friction force is reduced due to wear of the friction plate.

SUMMARY OF THE INVENTION

An object of the present invention is to provide a stable hysteresis of the hysteresis mechanism.

Another object of this invention is to provide a structure by which the hysteresis mechanism operates.

To accomplish above described objects, the torque variation absorbing device of the present invention provides a hysteresis mechanism comprising a friction plate arrangement and a spring means with the friction plate arrangement connected with a first or second flywheel member.

In this arrangement of the device, the friction force is usually obtained by the spring means when the friction plate member has become worn. Therefore, the hysteresis mechanism is able to provide for a stable hysteresis.

BRIEF DESCRIPTION OF THE DRAWINGS

These and other objects and advantages of the present invention will become more apparent and more readily appreciated from the following detailed description of the preferred exemplary embodiments of the invention taken in conjunction with accompanying drawings, wherein.

DETAILED DESCRIPTION OF THE PREFERRED EMBODIMENTS

A torque variation absorbing device constructed in accordance with a preferred embodiment of the present invention will be described with reference to the drawings.

Figure 1:
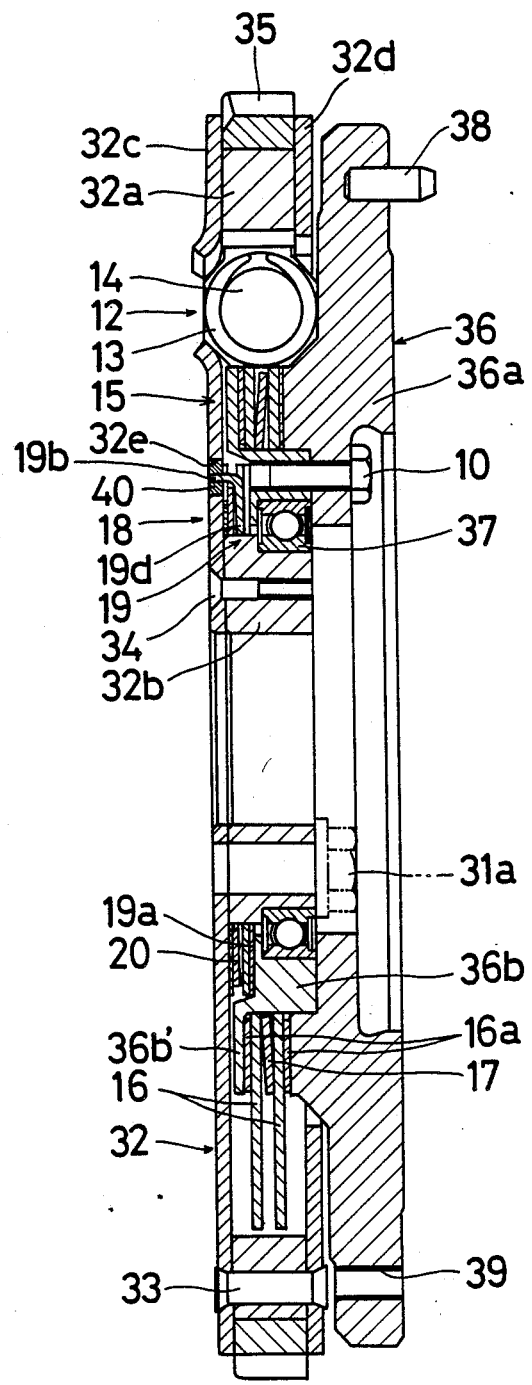
FIG. 1 is a sectional view of a torque variation absorbing device constructed in accordance with a preferred embodiment of the present invention.
Figure 2:
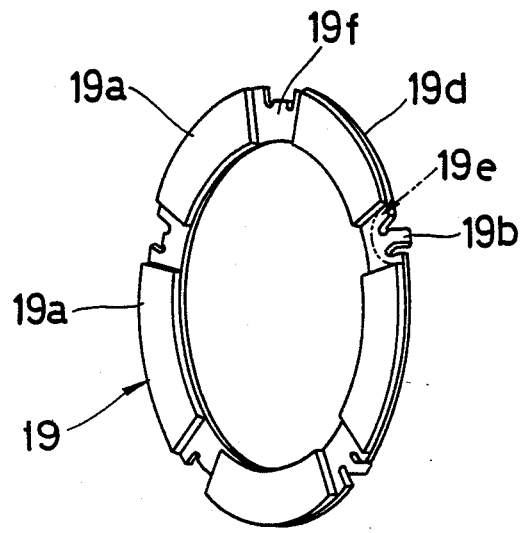
FIG. 2 is a perspective view of a friction plate of the torque variation absorbing device in FIG. 1.

In FIGS. 1 and 2, a first flywheel member 32 is connected to a crankshaft of an engine with bolts 31a, and the crankshaft with the first flywheel member 32 rotate together.

The first flywheel member 32 comprises an outer body 32a shaped like a ring, an inner body 32b shaped like a ring, and a first and a second driving plates 32c and 32d, respectively, which clamp the bodies 32a and 32b from both sides thereof by rivets 33 or screws 34.

On a periphery of the outer body 32a, a ring gear 35 is press-fitted or shrink-fitted for accommodating the starting of the engine by engagement with the flywheel of the engine (not shown). A radially outside portion of the inner body 32b supports a bearing 37.

The second flywheel member 36 is installed parallel to and coaxial with the first flywheel member 32, and is rotatably supported by the first flywheel member 32 through the bearing 37. The second flywheel member 36 comprises a first driven plate 36a and a second driven plate 36b which are clamped to each other by bolts 10. A radially inside portion of the second driven plate 36b is supported on the bearing 37.

On one side of the first driven plate 36a, pins 38 are set for positioning a clutch cover member. Bolt holes 39 are provided for clamping a clutch over member and a face of the first driven plate is shaped for engaging a clutch disc member with a pressure plate of the clutch cover member for transmitting power of the engine to the transmission.

On a periphery of the second driven plate 36b, a projection 36b' is formed for providing a damping action by a torque limiting mechanism 15, described in more detail below, with respect to the other side of the first driven plate 36a.

A spring mechanism 12 is provided between the first flywheel member 32 and the second flywheel member 36. The spring mechanism 12 is composed of coil springs 13 and seats 14 provided at both ends of each coil spring 13. One seat 14 is in contact with one end of edges formed by recesses of the first and second driving plates 32c and 32d, while the other seat 14 is in contact with one end of edges formed by recesses of driven discs 16 which provide the damping and torque limiting mechanism 15. When torque is not being transmitted, a gap is provided between one of the seats 14 and one of the edges of the first and second driving plates 32c and 32d.

The damping and torque limiting mechanism 15 is located radially inwardly of the spring mechanism 14 and comprises a pair of driven discs 16 and a cone spring 17 installed between the driven discs 16 so as to bias the driven discs 16 against the first and second driven plates 36a and 36b. Positioned on both of the outer side surfaces of the driven discs 16 are friction linings 16a which are in contact with the first and second driven plates 36a and 36b. Variations due to torque variations can be damped by a sliding friction loss produced between the linings 16a and the first and second driven plates 36a and 36b.

When the torque transmission is less than the frictional force produced by engagement of the cone spring 17 on the driven discs 16, the driven discs 16 rotate with the first and second driven plates 36a and 36b. When the torque transmission exceeds the frictional force, a relative slip is produced between the driven discs 16 and the first and second driven plates 36a and 36b, so at to prevent the transmission of the torque which would exceed the frictional force.

The hysteresis mechanism 18 is located further radially inwardly of the damping and torque limiting mechanism 15 and is interposed between the first drive plate 32c and the second driven plate 36b. A friction plate 19 comprises friction linings 19a and a ring plate 19d. Pawls 19b are connected to the openings 32e of the first driving plate 32c through caps 40 so as to correspondingly rotate with the first driving plate 32c. The friction linings 19a are positioned between the ring plate 19d and the second driven plate 32b.

Figure 6:
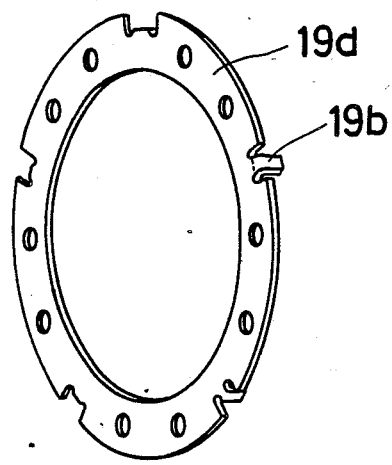
FIG. 6 is a perspective view of a ring plate of the friction plate shown in FIGS. 2 and 3.

A cone spring 20 is positioned between the friction plate 19 and the first driving plate 32c so as to produce the hysteresis force between the friction linings 19a and the second driven plate 36b. As shown in FIG. 2, five arcuate segments of the friction linings 19a are fastened to the ring plate 19d and are positioned with circumferentially equal channel intervals 19f. The plate is shown in FIG. 6 without the arcuate segments of friction linings 19a. Each pawl 19b is provided on the same circumferential section of the ring 19 as the channel 19f. By the above arrangement, spaces or border areas 19a are formed between the pawls 19b and the arcuate segments of the friction linings 19a.

Figure 3:
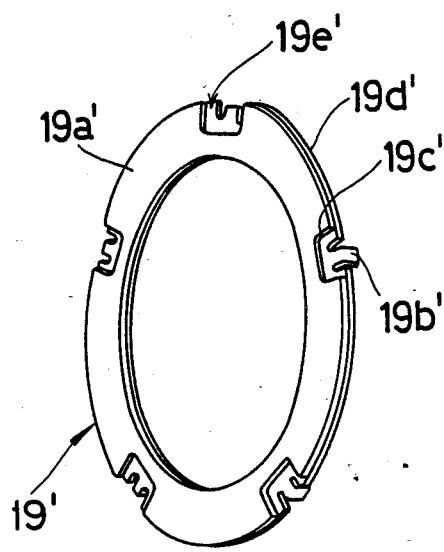
FIG. 3 is a perspective view of a friction plate with another embodiment of the present invention.

Referring to FIG. 3, a one piece friction lining 19a continuously extends circumferentially on a radially inside section of ring 19' and has recesses 19c' on a radially outside section of the ring. The lining is fastened to the ring plate 19d' so that the recess 19c' and the pawls 19b circumferentially correspond to each other. As in the FIG. 2 embodiment, spaces or border areas 19e' are formed between the pawls in 19b' and the friction lining 19a'.

Figure 4:
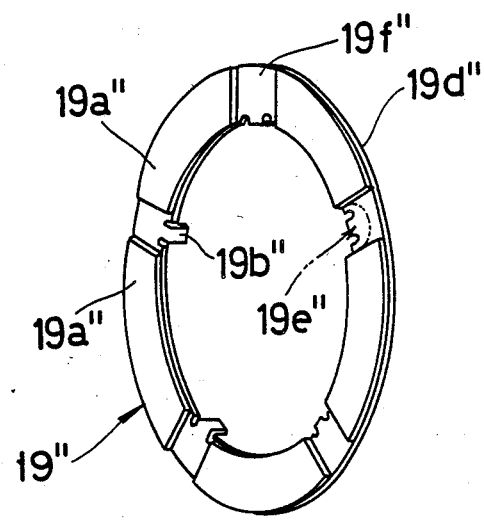
FIG. 4 is a perspective view of a friction plate with still another embodiment of the present invention.

Referring to FIG. 4, there is disclosed a ring 19" in which a ring plate 19d has pawls 19b" on a radially inside portion of the ring 19" as compared with that shown in FIG. 2.

Figure 5:
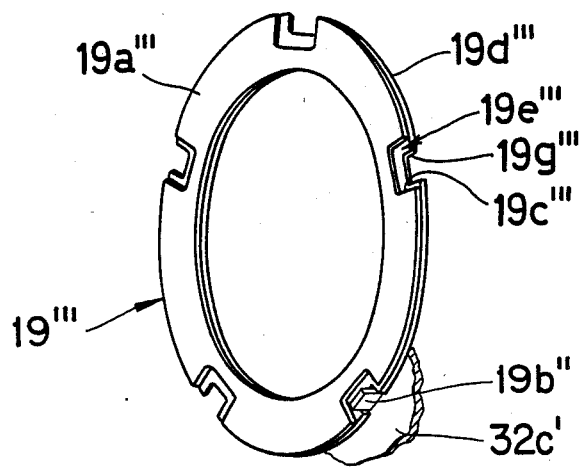
FIG. 5 is a perspective view of a friction plate with still another embodiment of the present invention.

Referring to FIG. 5, a ring 19'''has a ring plate 19d''' provided with notches 19g''' connection with pawls 19b'''. In this way, the pawls connected to the notches 19g''' are connected with the first driving plate 32c'''. The friction lining 19a''' *continuously extends circumferentially on the radially inner portion of the ring plate 19d'''* and has recesses 19c''' *on a radially outer portion of the ring plate so as to circumferentially correspond with the notches 19g'''*. Therefore, the spaces or border areas 19e are formed between the notches 19g''' and the friction lining 19'''.

From the above description it will be appreciated that, the friction lining 19a is fastened to the ring plate 19d so as to avoid interference, along the outer circumference of the plate, with the connecting means 19b or 19g, i.e. the space 19e is provided between the friction lining 19a and the connecting means 19b or 19g. Due to this arrangement of the friction lining, with respect to the plate, the friction lining material does not flow, before condensation, to the connecting means 19b or 19g and any adhesive agent required for securing the lining to the plate does not spread to the connecting means 19b or 19g.

Although only several preferred embodiments of the present invention have been described in detail, it will be appreciated by those skilled in the art that various modifications and alterations can be made of the preferred embodiments shown without materially departing from the novel teachings and advantages of this invention. Accordingly, it is to be understood that all such modifications and alterations are included within the scope of the invention as defined by the following claims.

What we claim is:

1. A torque variation absorbing device comprising:
   a first flywheel member mounted for rotation about an axis and connected to a crankshaft of an engine,
   a second flywheel member disposed parallel to and coaxial with said first flywheel member and rotatably supported by said first flywheel member by a bearing means, and
   a first spring mechanism, a damping and torque limiting mechanism and a hysteresis mechanism interposed between said first flywheel member and said second flywheel member, said hysteresis mechanism comprising a friction plate means and a second spring mechanism, said damping and torque limiting mechanism is positioned radially inwardly of said first spring mechanism, and said hysteresis mechanism is located radially inwardly of said damping and torque limiting mechanism,
   said friction plate means including a ring plate and a friction lining means fastened to an axially facing surface of said ring plate, said ring plate having at a circumferentially extending edge portion thereof a first connecting means, said surface defining a border area contiguous with and bordering said first connecting means,
   one of said first and second flywheel members having a second connecting means connected to said first connecting means for establishing a drive connection therebetween,
   one of said first and second connecting means comprising an axially extending pawl member and the other of said first and second connecting means comprising an opening receiving said pawl member,
   said friction lining means comprising a plurality of separate arcuate segments disposed circumferentially on said surface of said ring plate and spaced circumferentially apart to define therebetween a channel coinciding with said border area, whereby said friction lining means is situated outside of said border area and wherein a radial edge of said friction lining means is disposed radially beyond an edge of said first connecting means to a radial edge of said ring plate adjacent said first connecting means.

2. The torque variation absorbing device of claim 1, wherein said border area extends radially and circumferentially as said ring plate is viewed along said axis.

3. The torque variation absorbing device of claim 1, wherein said first connecting means is a pawl member, and said second connecting means comprises an opening in said one of said first and second flywheel members for receiving said pawl member, and said edge portion of said ring plate being a radially outward portion.

4. The torque variation absorbing device of claim 1, wherein said first connecting means is a pawl member, and said second connecting means comprises an opening in said one of said first and second flywheel members for receiving said pawl member, and said edge portion of said ring plate being a radially inward portion.

5. A torque variation absorbing device comprising:
a first flywheel member mounted for rotatation about an axis and connected to a crankshaft of an engine,
a second flywheel member disposed parallel to and coaxial with said first flywheel member and rotatably supported by said first flywheel member by a bearing means, and
a first spring mechanism, a damping and torque limiting mechanism and a hysteresis mechanism interposed between said first flywheel member and said second flywheel member, said hysteresis mechanism comprising a friction plate means and a second spring mechanism, said damping and torque limiting spring mechanism is positioned radially inwardly of said first spring mechanism, and said hysteresis mechanism is located radially inwardly of said damping and torque limiting mechanism,
said friction plate means including a ring plate and a friction lining means fastened to an axially facing surface of said ring plate,
said ring plate at a circumferentially extending edge portion thereof having a first connecting means, said surface defining a border area contiguous with and bordering said first connecting means,
one of said first and second flywheel members having a second connecting means connected to said first connecting means for establishing a drive connection therebetween,
one of said first and second connecting means comprising an axially extending pawl member, and the other of said first and second connecting means comprising an opening receiving said pawl member,
said friction lining means comprising a single circumferentially extending piece of friction lining having a recess on an edge thereof coinciding with said border area, whereby said friction lining means is situated outside of said border area and wherein said edge of said friction lining means is disposed radially beyond an edge of said first connecting means to a radial edge of said ring plate adjacent said first connecting means.

6. The torque variation absorbing device of claim 5, wherein said first connecting means is a pawl member, and said second connecting means comprises an opening in said one of said first and second flywheel members for receiving said pawl member, and said pawl edge portion of said ring plate being a radial outward portion.

7. The torque variation absorbing device of claim 5, wherein said first connecting means is an opening formed in said ring plate, said second connecting means comprising a pawl on said one of said first and second flywheel members and disposed in said opening.

* * * * *